May 24, 1927.  1,629,867
H. F. HERMAN
ELECTRICAL CONDENSER
Filed March 26, 1925
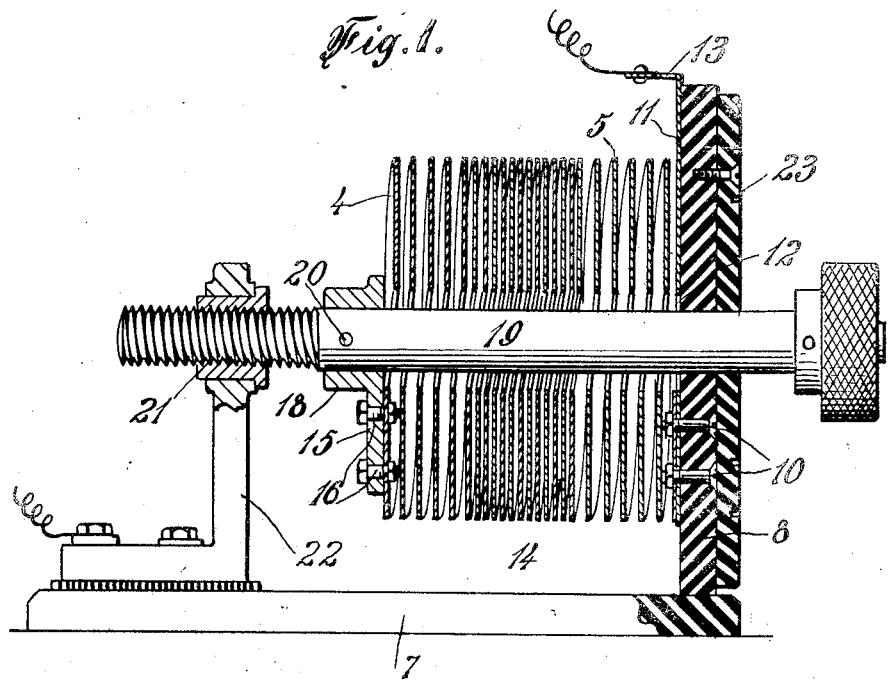
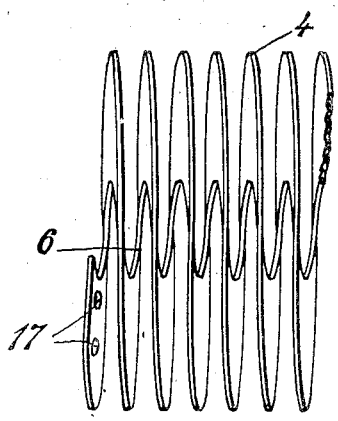
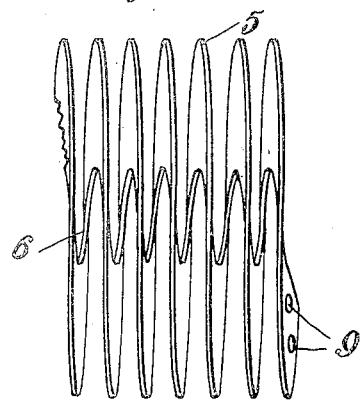
INVENTOR
Henry F. Herman
BY
ATTORNEY

Patented May 24, 1927.

1,629,867

UNITED STATES PATENT OFFICE.

HENRY F. HERMAN, OF CHAPPAQUA, NEW YORK, ASSIGNOR TO STRAITLINE RADIO CORPORATION, OF NEW YORK, N. Y., A CORPORATION OF NEW YORK.

ELECTRICAL CONDENSER.

Application filed March 26, 1925. Serial No. 18,472.

This invention relates to electric condensers having inductance capacity of variable value, and particularly adapted for use in radio transmitting and receiving apparatus, and it is the object of the invention to provide a condenser of this character which is simple in structure having a minimum number of parts, novel, compact and durable, and highly efficient in use, and one which is readily adjustable to vary the capacity with accuracy.

In carrying out the invention I provide spirally formed plate electrodes arranged in coaxial alinement with the convolutions of each electrode equidistantly spaced and perpendicular to the axis thereof and adapted to be adjusted in axial direction by a rotary movement to interengage one plate with another plate to increase and decrease the value of the inductance capacity of the condenser.

In the drawing accompanying and forming a part of this specification Figure 1 is a longitudinal sectional view of the variable electric condenser illustrating an embodiment of my invention; and Figures 2 and 3 are side elevations of plate electrodes of the condenser shown in Figure 1.

In the embodiment of the invention illustrated in the drawing I provide a pair of helically or spirally formed plate electrodes 4 and 5 with the successive convolutions of each plate spaced in predetermined equidistant relation one to the other and extending substantially perpendicular to the axis of the plates, and with a bore or opening 6 axially through each of the plates. The plates are mounted in coaxial relation and the convolutions of the plates are moved and adjusted into and out of variable interengagement for altering or varying the value of the inductance capacity of the condenser.

The condenser is particularly adapted for use in connection with radio receiving apparatus wherein the parts are mounted upon a mounting member comprising a base board 7 and a panel 8 arranged at a right angle to the base board both being of non-conducting material. In the present instance the plate 5 is arranged with perforations 9 at one extremity for securing means to mount the same upon the panel 8, shown as bolts 10 engaged in perforations in the panel and the plate perforations, a conductor element in the form of a metallic plate 11 having an opening 12 being interposed between the panel and electrode plate and secured in position by the bolts 10, the conductor plate having an extended portion 13 for connection of a conductor to connect the plate electrode in one side of the condenser circuit.

The electrode plate 4 is rotatably mounted coaxially to the plate 5 to have axial adjustment toward and away from said plate 5 and interengage the convolutions of said plate 4 with the convolutions of plate 5, the convolutions of the respective plates being so arranged that when they are interengaged they will be out of contact and insulated by an air space, as shown at 14 in Figure 1. In the embodiment shown to mount and effect this adjustment of plate 4 it is fixed to an arm 15 by bolts or rivets 16 fitted in perforations in said arm and perforations 17 in the one extremity of the plate. The arm has a hub portion 18 for the engagement of a shaft 19 and whereby it is secured thereto as by a pin 20. The shaft extends through the axial openings of the condenser plates and is at its forward end mounted in the panel 8 to have rotatable and longitudinal movement, the opposite end of the shaft being threaded and engaging a threaded bushing 21 fixed in a support mounted upon and insulated from the base board 7. The electrode plate 4 is connected in the side of the condenser circuit opposite to the plate 5 through the shaft 19 and support 22 by a conductor connected to said support. While it is not absolutely essential the pitch of the shaft threads is the same as the pitch of the convolutions of the electrode plates so that as the shaft is given one complete revolution the electrode plate will be advanced toward or moved in a direction away from the fixed electrode plate one convolution of the plate 4 and the extent of the adjustment may be indicated on a dial 23 fixed to the front of the panel 8 by a pointer (not shown) rotatable with the shaft. It will be obvious that the value of the capacity of the condenser will be increased or decreased by the adjustment of the electrode plate 4 to interengage the convolutions of the plate 4 with the convolutions of the plate 5.

While the electrode plates may be constructed in various ways they are preferably made in one piece from a bar or rod. This is accomplished by providing a bar of the desired cross sectonal dimension of the plate as well as cross sectional form thereof, arranging the bar with a coaxial bore of the desired size of the opening in the plates, and then forming the spiral or helical convolutions of the plate by a milling cutter.

While I have illustrated and described one form of a construction and arrangement of my improved condenser, it will be obvious that various modifications may be resorted to and come within the scope of the invention.

Having thus described my invention I claim:

1. In an electric condenser, a spiral plate electrode having the convolutions spaced equidistant from each other and perpendicular to the axis of the spiral with an opening axially therethrough and arranged to be supported and connected in an electric circuit at one end and with the marginal portions of the convolutions of the plate having no physical connection with each other.

2. In an electric condenser, a pair of electrodes each formed of a spirally arranged plate with no physical connection between the marginal portions of the convolutions of the plates, one of which electrodes is fixedly supported at one end only, a rotatable support to which the other electrode is fixed at one end co-axially of the first electrode and through the rotation of which support the electrode is adapted to be adjusted axially of the first electrode to move the free end into and out of inter-engaging relation with the free end of the other electrode to a variable extent to vary the inductance capacity of the condenser.

3. In an electric condenser, a spirally formed plate electrode fixedly supported and adapted for connection in an electric circuit at one end, a shaft rotatably supported axially and out of electrical connection with said electrode, a second spirally formed plate electrode through which the shaft extends mounted at one end only and adapted for connection in an electric circuit through said shaft with the free end in opposed relation to the free end of the first electrode and through the rotation of which shaft said electrode is adapted to be adjusted axially to a variable extent into and out of interengaging relation with the first electrode to vary the inductance capacity of the condenser.

4. In an electric condenser, a spiral plate electrode arranged with an opening therethrough and having no physical connection at the marginal portions of the convolutions of the plate, and insulator support, means for fixedly mounting said plate at one end upon said support and connect the same in an electric circuit, a shaft rotatably mounted in said support to extend axially through and out of electrical connection with said electrode the end of said shaft being threaded, a fixed support in which the threaded end of the shaft has connection, a second spiral plate electrode arranged with an opening therethrough and have no physical connection at the marginal portions of the convolutions of the plate and through which opening in the plate the shaft extends without physical connection with the marginal portions of the convolutions of the plate, means to fix said plate at one end upon the shaft with the free end in opposed relation to the free end of the first electrode and connected through the shaft in the electric circuit of said first electrode, said second electrode being axially adjustable through the rotation of the shaft to interengage the free end thereof with the first electrode to a variable extent to vary the value of the inductance capacity of the condenser.

Signed at New York city, in the county of New York and State of New York this 23rd day of March, 1925.

HENRY F. HERMAN.